(12) United States Patent
Chen et al.

(10) Patent No.: US 10,739,482 B2
(45) Date of Patent: Aug. 11, 2020

(54) SURFACE WAVE PROSPECTING METHOD AND ACQUISITION EQUIPMENT

(71) Applicant: SOUTHERN UNIVERSITY OF SCIENCE AND TECHNOLOGY, Shenzhen, Guangdong (CN)

(72) Inventors: Xiaofei Chen, Guangdong (CN); Zhentao Yang, Guangdong (CN); Jiannan Wang, Guangdong (CN)

(73) Assignee: SOUTHERN UNIVERSITY OF SCIENCE AND TECHNOLOGY, Shenzhen (CN)

( * ) Notice: Subject to any disclaimer, the term of this patent is extended or adjusted under 35 U.S.C. 154(b) by 63 days.

(21) Appl. No.: 16/000,471

(22) Filed: Jun. 5, 2018

(65) Prior Publication Data

US 2019/0113642 A1    Apr. 18, 2019

Related U.S. Application Data

(63) Continuation-in-part of application No. PCT/CN2017/105837, filed on Oct. 12, 2017.

(51) Int. Cl.
*G01V 1/30* (2006.01)
*G01V 1/24* (2006.01)
*G01V 1/28* (2006.01)

(52) U.S. Cl.
CPC .............. *G01V 1/306* (2013.01); *G01V 1/247* (2013.01); *G01V 1/282* (2013.01); *G01V 1/284* (2013.01); *G01V 1/307* (2013.01)

(58) Field of Classification Search
CPC ... G01V 1/30; G01V 1/24; G01V 1/28; G01V 1/247; G01V 1/282; G01V 1/307; G01V 1/306; G01V 1/284
See application file for complete search history.

(56) References Cited

U.S. PATENT DOCUMENTS

2010/0027377 A1*  2/2010  Zuercher ............ G01V 1/28
                                                    367/73
2010/0286921 A1* 11/2010  Lee .................... G01V 1/28
                                                    702/17

* cited by examiner

*Primary Examiner* — Hovhannes Baghdasaryan
*Assistant Examiner* — Amie M Ndure
(74) *Attorney, Agent, or Firm* — Nixon & Vanderhye PC (57) ABSTRACT

The technical solution of the present application is applicable to the technical field of geophysical exploration, and provides a surface wave prospecting method and an acquisition equipment. This method comprises: obtaining vibration data by a vibration collecting device; calculating a dispersion graph by applying a vector wavenumber transform method to the vibration data, extracting dispersion curves from the dispersion graph, wherein the dispersion curves include fundamental mode and higher modes of dispersion curves of surface wave; establishing an initial stratigraphic model according to the dispersion graph; and performing a dispersion curves inversion based on the initial stratigraphic model and an inversion algorithm. The present technical solution can extract dispersion information of higher modes of surface wave from vibration data for reducing the non-uniqueness of inversion; computation time of the inversion algorithm can be reduced by establishing the initial stratigraphic model, and the instability of the inversion algorithm can be reduced, too. In this way, vibration collecting devices can be arranged arbitrarily, the requirement for the site layout is reduced, and the adaptability of surface wave prospecting is improved.

6 Claims, 7 Drawing Sheets

SURFACE WAVE PROSPECTING METHOD AND ACQUISITION EQUIPMENT

CROSS REFERENCE TO RELATED APPLICATIONS

This application is a continuation-in-part of International Application No. PCT/CN2017/105837 filed 12 Oct. 2017, which designated the U.S., the entire contents of which is hereby incorporated by reference.

TECHNICAL FIELD

The present application pertains to the technical field of geology and geophysical prospecting, and more particularly, relates to a surface wave prospecting method and an acquisition equipment.

BACKGROUND

Since 1950s, scientists found that a phase velocity of Rayleigh wave in a layered medium is changed with frequency, and shows an obvious frequency dispersion property. Rayleigh wave in horizontally layered medium is generated by mutually interfering and overlapping P wave and shear wave at various interfaces in a seismic source region. The Rayleigh wave carries information of medium in various layers including P wave velocity, shear wave velocity, and density, and etc., and the velocities depend on a distribution of shear wave in the layered medium mainly. Variation of energy and velocity of Rayleigh wave induced by underground structure, frequency dispersion generated, which reflects some inherent characteristics of the layered medium. From this, deep underground structure can be solved by studying natural seismic wave's low dispersion curves of Rayleigh wave. Shallow underground structure such as engineering exploration, site evaluation and foundation treatment, obstacles and cavity detection, etc. can be solved by studying on higher dispersion curves by man-made seismic source.

Surface wave prospecting is the most popularly geophysical exploration method in engineering geophysical exploration, and can be divided into two types according to different seismic sources, that is, an active source method and a passive source method. Wherein, the active surface wave is generated by activating seismic source artificially. The passive source, as the name implies, is called with respect to the active source surface wave, that is, there is no need to generate seismic sources artificially and proactively, however, various vibrations generated by natural phenomenon such as tide, wind, volcano activity, etc., and by various human activities such as vehicle movement, mechanical movement in the factory, human movements, etc., are taken as the seismic sources instead.

In city engineering geophysical exploration, the active source surface wave geophysical exploration needs artificial seismic sources, and thus may have certain influence on the environment, and also have some requirements on site condition. Observation array needs to be linearly arranged, geophysical exploration can't be implemented frequently in complex regions of the city. Moreover, energy of surface wave activated by artificial seismic source is limited. The depth of exploration always fails to meet the need of engineering exploration. Thus, there are many limitations in the active source surface wave method in engineering exploration. For this reason, a passive source surface wave prospecting method is introduced into the field of engineering geophysical exploration.

One of the core problems of passive source surface wave geophysical exploration is about how to extract dispersion curves from collected seismic wave data. At the present stage, methods for extracting dispersion curves of passive surface waves mainly include: F-K (Frequency-Wavenumber) method and SPAC (Space Autocorrelation Method) based on Fourier transform. The both methods have own advantages and disadvantages respectively, wherein although the F-K method can identify higher modes of surface waves, it has a low resolution and data needs to be collected simultaneously with a great number of receiving points; since the SPAC method requires less receivers, it has now become the most popular passive source surface wave method. However, the SPAC method can't extract higher modes surface wave dispersion curves, but can only extract the fundamental mode dispersion curve, and the observation array still need to be arranged in certain rules and shapes.

Technical Problem

In view of this, an example embodiment of the present application provides a surface wave prospecting method and an acquisition equipment, which aims at solving problems that higher modes of surface wave can't be extracted in passive source surface wave geophysical exploration, and observation array need be arranged regularly.

Technical Solution

In a first aspect, an example embodiment of the present application provides a surface wave prospecting method, comprising:

obtaining vibration data by the vibration collecting device;

calculating a dispersion graph by applying a vector wavenumber transform method to the vibration data, extracting dispersion curves from the dispersion graph including a fundamental mode and higher modes of dispersion curves of surface wave;

establishing an initial stratigraphic model according to the dispersion graph; and applying a dispersion curves inversion based on the initial stratigraphic model and an inversion algorithm.

In a second aspect, an embodiment of the present application provides a surface wave prospecting instrument including:

an obtaining module configured to obtain vibration data which is collected by a vibration collecting device;

an extracting module configured to obtain a dispersion graph according to the vector wavenumber transform method and the vibration data, and extract dispersion curves from the dispersion graph including fundamental mode and higher modes of dispersion curves of surface wave;

an establishing module configured to establish an initial stratigraphic model based on the dispersion graph; and an inverting module configured to invert the dispersion curves based on the initial stratigraphic model and an inversion algorithm.

In a third aspect, an embodiment of the present application provides a surface wave prospection acquisition equipment including a storage device, a processor, and computer program stored in the storage device and executable on the processor, wherein method steps implemented by the processor by executing the computer program comprise:

obtaining vibration data by a vibration collecting device;

calculating and obtaining a dispersion graph according to a vector wavenumber transform method and the vibration data, extracting dispersion curves from the dispersion graph; wherein the dispersion curves includes fundamental mode surface wave dispersion curves and higher modes surface wave dispersion curves;

establishing an initial stratigraphic model according to the dispersion graph; and performing a dispersion curves inversion based on the initial stratigraphic model and an inversion algorithm.

In a fourth aspect, an embodiment of the present application provides a computer readable storage medium which stores computer program, wherein method steps implemented when the computer program is executed by a processor comprise:

obtaining vibration data which is collected by a vibration collecting device;

obtaining a dispersion graph according to a vector wavenumber transform method and the vibration data, extracting dispersion curves from the dispersion graph; wherein the dispersion curves includes fundamental mode surface wave dispersion curves and higher modes surface wave dispersion curves;

establishing an initial stratigraphic model according to the dispersion graph; and performing a dispersion curves inversion based on the initial stratigraphic model and an inversion algorithm.

Advantageous Effects

Example embodiments of the present application use VWTM (Vector Wavenumber Transform Method) to obtain the dispersion graph, extract the dispersion curves including fundamental mode and higher modes of surface waves from the dispersion graph, establish the initial stratigraphic model, performs dispersion curves inversion based on the initial stratigraphic model and the inversion algorithm, thereby implementing an exploration of stratum, higher modes surface wave frequency dispersion information can be extracted from vibration data, and the higher modes surface wave frequency dispersion information is added into stratum inversion operation, for reducing non-uniqueness; computation time of the inversion algorithm can be reduced by establishing the initial stratigraphic model, and the instability of the inversion algorithm can also be reduced. The vibration collecting device can be arranged arbitrarily, the requirement on site layout is reduced, and site adaptability of surface wave prospecting is improved.

BRIEF DESCRIPTION OF THE DRAWINGS

In order to explain the example embodiments of the present invention more clearly, a brief introduction regarding the accompanying drawings that need to be used for describing the embodiments or the prior art is given below; it is obvious that the accompanying drawings described as follows are only some embodiments of the present invention, for those skilled in the art, other drawings can also be obtained according to the current drawings at the premise of paying no creative labor.

DETAILED DESCRIPTION OF THE PREFERRED EMBODIMENTS

The following descriptions are intended to illustrate but not be regarded as limitation, specific details such as a specified system structure, technology, etc., are proposed for facilitating a full understanding of the embodiments of the present application. However, one of ordinary skill in the art should understand that, the present application can also be implemented in some other embodiments without the specific details. In some cases, detailed descriptions of systems, devices, circuits and methods that are known to all are omitted, such that unnecessary details are prevented from obstructing the description of the present application.

Figure 1:
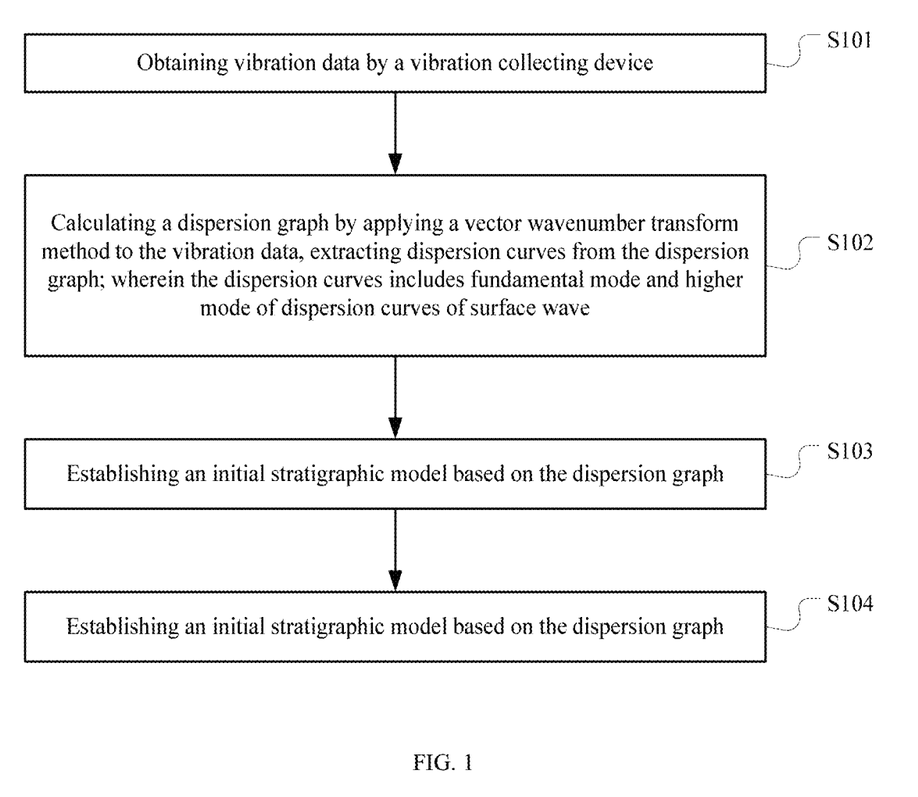
FIG. 1 illustrates a flow chart of a surface wave prospecting method provided by one embodiment of the present application.

In order to explain the technical solution of the present application, an explanation is performed using detailed embodiments below:

FIG. 1 illustrates an implementation flow chart of a surface wave prospecting method provided by an embodiment of the present application, which is described in detail as follows:

in step 101, obtaining vibration data by a vibration collecting device.

In this embodiment, the vibration collecting device includes but is not limited to an engineering seismic instrument or a wave detector, for example, a plurality of wired engineering seismic instruments or independent and wireless engineering seismic instruments can be used. Preferably, the wave detector can be a wide band wave detector having a basic frequency of not higher than 4 HZ, the faster the collection of bandwidth, the better the collection of the surface waves of various frequencies. The number of the vibration collecting device is more than or equal to a preset number; for example, the number of the wave detectors is more than or equal to 12. A sampling frequency of the vibration collection device should meet a purpose of prospecting. A sampling rate of engineering exploration is no less than 200 HZ generally. A synchronization collecting time of the vibration collecting device is more than or equal to the preset time.

In step S102, calculating and obtaining a dispersion graph based on VWTM (English name: Vector Wavenumber Transform Method abbreviated as VWTM) and the vibration data; extracting dispersion curves from the dispersion graph; the dispersion curves includes fundamental mode surface wave dispersion curves and higher modes surface wave dispersion curves.

The space correlation algorithm (SPAC) is an ambient seismic noise research method proposed by a geophysicist named Aki in 1957 with a calculation formula as follows:

$$\rho(\omega, r) = J_0(rk) = J_0\left(r\frac{\omega}{c(\omega)}\right) \tag{1}$$

where, $\rho(\omega, r)$ is space autocorrelation coefficient, $\omega$ is an angular frequency, $\omega=2\pi f$, r is defined as a distance between any two points, k is a wavenumber, $k=\omega/c$, c is a phase velocity, $J_0$ is a first kind of Bessel function of zeroth order. It can be seen that, space autocorrelation coefficient is the first kind of Bessel function of zeroth order surface wave phase velocity, frequency, and the station distance. Therefore, the surface wave phase velocity can be solved by fitting the space autocorrelation coefficient.

Figure 2:
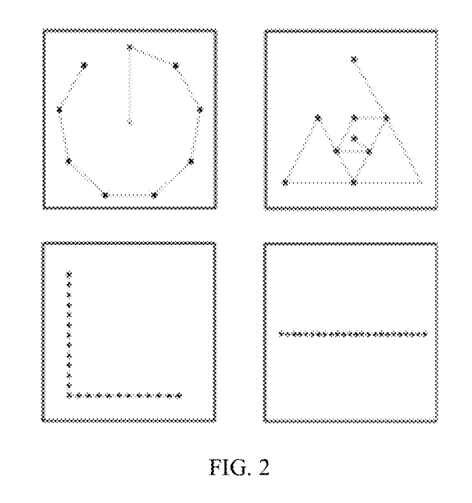
FIG. 2 illustrates a distribution of observation array of an existing space autocorrelation method provided by the embodiment of the present application.

The existing space autocorrelation method has deficiencies, which are listed as follows:

1. the SPAC requires that the observing station which corresponds to the vibration collecting device must be arranged according to certain rules, such as linear shape, circular shape, L-shape, etc., (as shown in FIG. 2), some site conditions must be met.

2. the SPAC performs approximation for actual signals greatly, it is considered that ambient seismic noise signals by way of ground propagation are mainly consisted of surface waves, and are dominant by the fundamental mode surface waves, the space autocorrelation coefficient is merely the fundamental mode.

3. the space autocorrelation method can only extract the fundamental mode surface wave dispersion curves from passive source surface waves, but can't extract higher modes dispersion curves surface wave effectively. In theory, there is a great uncertainty in inverting stratum structure which merely relies on fundamental mode dispersion curves of surface wave. If the higher modes surface wave dispersion curves can be extracted and used for inversion, then, the non-uniqueness of inversion will be reduced greatly.

The embodiment of the present application proposes the VWTM, which can extract the fundamental mode and higher modes surface wave information from vibration data, thereby applying higher modes dispersion curves surface wave in stratum inversion, and reducing the non-uniqueness of inversion.

As one embodiment of the present application, a calculation formula of the VWTM is:

$$\int_0^{+\infty} \tilde{C}(r,\omega)J_0(kr)rdr = A \cdot \text{Im}\{g(\omega,k)\}$$

wherein, $\tilde{C}(r, \omega)$ is a cross-correlation spectrum, A is a constant, $r=|\vec{r}|$ is a distance between two observation array, $\omega$ is an angular frequency, $\omega=2\pi f$, f is a frequency, $g(\omega, k)$ is a kernel function of a vertical vector of a Green's function, $k=\vec{k}$ is a wave number.

Particularly, $\tilde{C}(r, \omega)$ is a cross-correlation spectrum between any two observation array.

A calculation process of the proposed VWTM is described as follows:

$u(\vec{x}, t)$ is the vertical component of ambient seismic data received at certain measuring point $\vec{x}$ on horizontally layered earth surface, then, a cross-correlation function between two ambient seismic noise observation arrays is defined as:

$$C(\vec{r},t)=u(\vec{x}_1,t)*u(\vec{x}_2,t) \tag{3}$$

wherein, $\vec{r}=\vec{x}_2-\vec{x}_1$, since ambient seismic noise is an isotropic and stochastic field in both time and space, a cross-correlation coefficient of ambient seismic data vertical component wave field of any two observation array is isotropic in space, that is:

$$C(\vec{r},t)=C(r,t).$$

Wherein, $r=|\vec{r}|$, according to the convolution theorem, when performing Fourier transform for formula (3), an expression of cross-correlation spectrum can be obtained:

$$\tilde{C}(r,\omega)=F[u(\vec{x}_1,t)]*F[u(\vec{x}_2,t)] \tag{4}$$

Wherein, $u(\vec{x}_1, t)$ and $u(\vec{x}_2, t)$ are ambient seismic data signals recorded by the two observation array respectively, $F[u(\vec{x}, t)]$ is Fourier transform of the ambient seismic data signals.

The Fourier transform of the cross correlation function of ambient seismic noise between two points is proportional to the imaginary part of the Green's function, $$\tilde{C}(r,\omega)=A \cdot \text{Im}\{G(\omega,r)\} \tag{5}$$

Wherein, A is a constant, $G(\omega, r)$ is a vertical component of the Green's function, which can be represented as:

$$G(\omega,r)=\int_0^{+\infty} g(\omega,k)J_0(kr)kdk. \tag{6}$$

$\tilde{C}(r, \omega)$ is processed according to VWTM and using a formula $\int_0^{2\pi} e^{ikr\cos\theta}d\theta=2\pi J_0(kr)$, obtained as follows:

$$\frac{1}{2\pi}\int\int \tilde{C}(r,\omega)e^{-i\vec{k}\cdot\vec{r}}d\Sigma(\vec{r}) = \int_0^{+\infty} \tilde{C}(r,\omega)J_0(kr)rdr \tag{7}$$

Substituting formula (5), formula (6) into $\tilde{C}(r, \omega)$ so as to perform VWTM, a following intermediate formula is obtained:

$$\int_0^{+\infty} \tilde{C}(r,\omega)J_0(kr)rdr = A\int_0^{+\infty} \text{Im}\{G(\omega,r)\}J_0(kr)rdr = \tag{8}$$

$$A\int_0^{+\infty}\int_0^{+\infty} \text{Im}\{g(\omega,k')\}J_0(rk')J_0(rk)k'rdk'dr$$

According to orthogonal property of Bessel function $$\int_0^{+\infty} J_0(kr)J_0(k'r)rdr = \frac{1}{\sqrt{kk'}}\delta(k-k'),$$

formula (8) can be reduced as:

$$\int_0^{+\infty} \tilde{C}(r,\omega)J_0(kr)rdr = \tag{9}$$

$$A\int_0^{+\infty} \text{Im}\{g(\omega,k')\}\frac{\delta(k-k')}{\sqrt{kk'}}k'dk' = A \cdot \text{Im}\{g(\omega,k)\}$$

Figure 7:
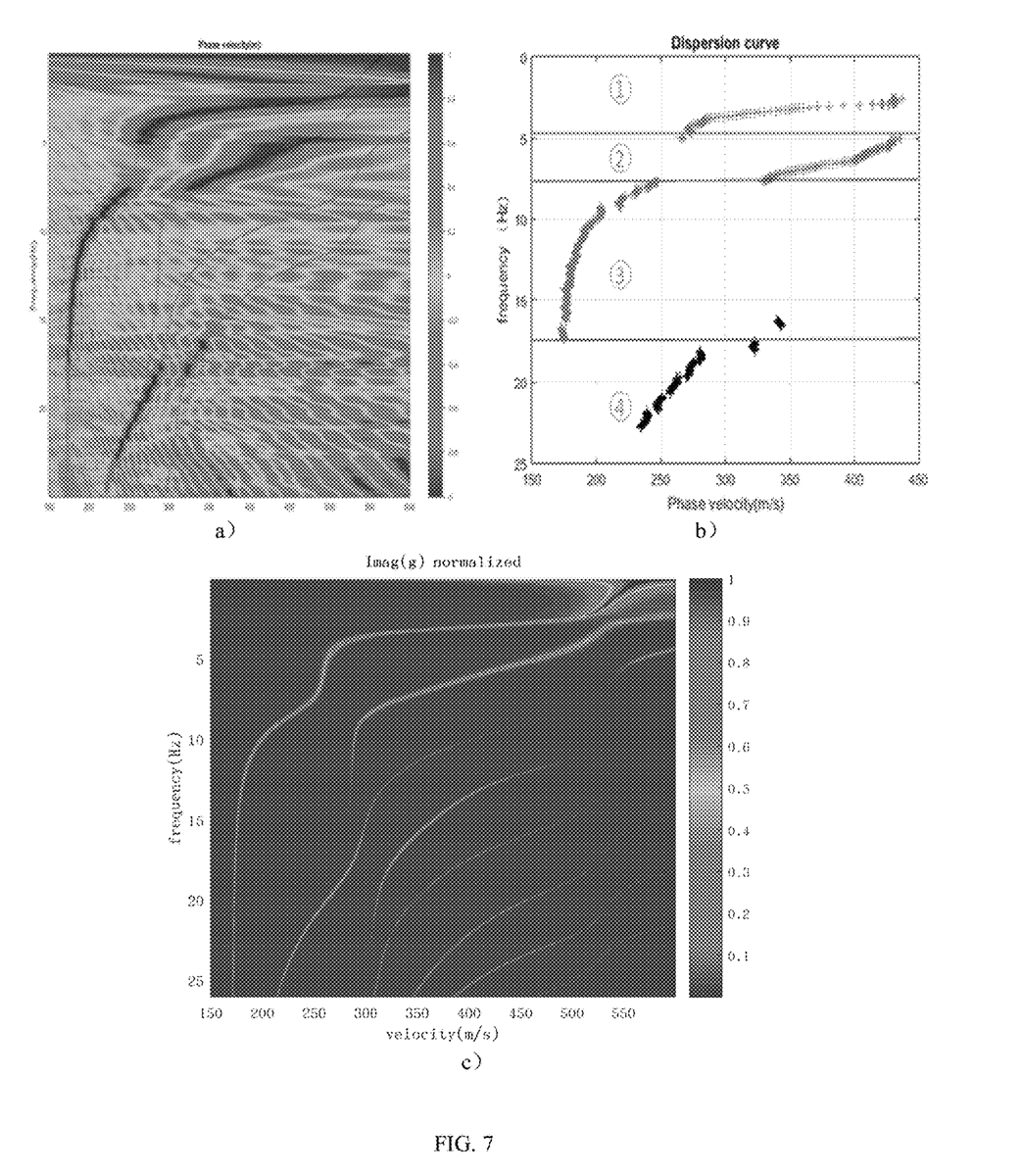
FIG. 7 illustrates a F-C domain dispersion graph, frequency range classification (b), and kernel function of a Green's function provided by the embodiment of the present application.

As shown in FIG. 7(c), $k=k_n(\omega)$, n=1, 2, 3, ... is the pole of the kernel function $\text{Im}\{g(\omega, k)\}$, $\text{Im}\{g(\omega, k)\}$ trend to infinity at $k_n(\omega)(n=1, 2, 3 \ldots)$. In an actual application process, since finite summation is used to replace integral, there are maximum value at $k_n(\omega)(n=1, 2, 3, \ldots)$. At this point, a new method for extracting dispersion curves is obtained, and we call it VWTM (Vector Wavenumber Transform Method).

According to the calculation formula of the VWTM, $\tilde{C}(r, \omega)$ can be obtained by calculating cross-correlation of the ambient seismic noise data between any two observation array, processing is performed according to formula (9), energy distribution of different modes of surface waves in frequency-wavenumber domain and frequency-velocity domain can be obtained by calculating values of the kernel function $g(\omega, k)$ with different wavenumbers k. Properties of waves are judged according to energy distribution patterns of the waves, distribution curves which contain higher modes can be further obtained. It should be noted that, the ambient seismic noise are mainly surface wave signals in actual exploration, and body wave signals merely occurs in some cases. After that, surface wave dispersion curves can be inverted so as to obtain shear wave velocity structure of underground medium.

Figure 3:
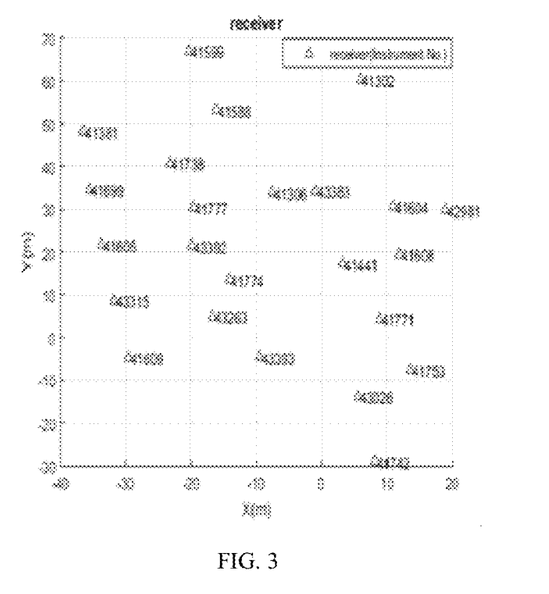
FIG. 3 illustrates a distribution of an observing station of a vector wavenumber transform method provided by the embodiment of the present application.

The proposed VWTM has following advantages:

1. VWTM is adopted, it is unnecessary to place the observation array that corresponds to the vibration collecting device according to certain rule, the observation array can be placed in any way; of course, they can be placed according to a linear shape, a circular shape, a L-shape, etc., there is no requirement for the site, as shown in FIG. 3.

2. The actually received ambient seismic noise data is consisted of waves generated by various vibrations, which not only contains surface waves, but also contains body waves. Moreover, surface waves would generate frequency dispersion phenomenon in inhomogeneous media, that is, surface waves are consisted of modes having different phase velocities. Thus, components of surface waves of different velocities (which contain fundamental mode and higher modes), and body waves can be separated according to the calculated dispersion graph.

Figure 4:
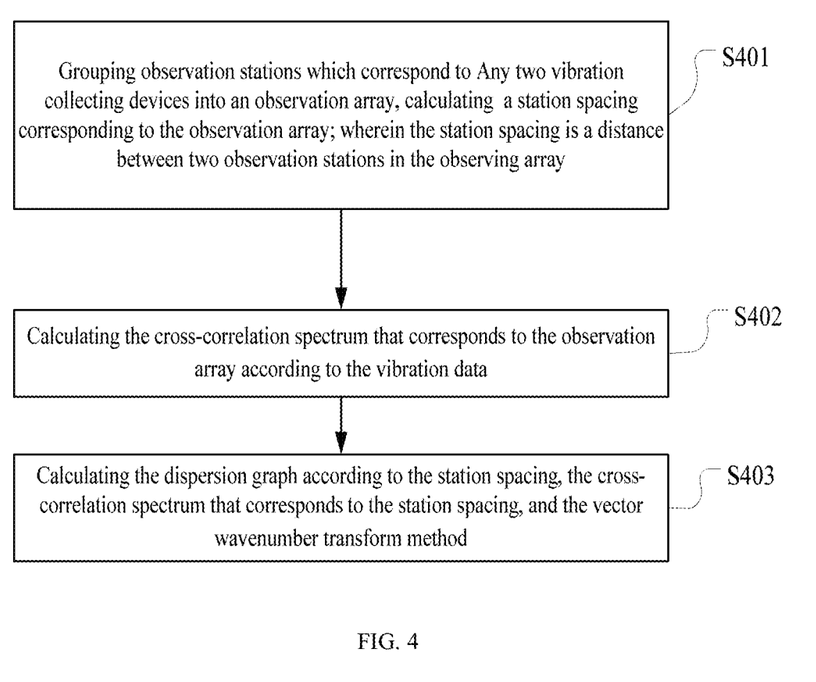
FIG. 4 illustrates an implementation flow chart of obtaining dispersion graph in the surface wave prospecting method provided by the embodiment of the present application.

As one embodiment of the present application, calculating and obtaining the dispersion graph based on VWTM and the vibration data in step S102 comprises:

in step S401, grouping any two observation array corresponding to the vibration collecting device into an observation array, calculating and obtaining a station spacing corresponding to the observation array; the station spacing is a distance between two observation array in the observation array.

In this embodiment, all the observation array are combined in pairs, if there are totally N observation array, m station spacings $r_1, r_2 \ldots r_m$ can be obtained, wherein, $m=C_n^2$.

In step S402, calculating and obtaining cross-correlation spectrum that corresponds to the observation array according to the vibration data.

Wherein, each observation array corresponds to a station spacing, cross-correlation spectrum value $\tilde{C}(r, \omega)$ of two observation array in the observation array which corresponds to the any group of station spacings $r_0$ under any frequency $\omega_0$ can be calculated according to the vibration data.

In step S403, calculating and obtaining the dispersion graph according to the station spacing, the cross-correlation spectrum and the VWTM.

Particularly, a scanning frequency sequence can be generated according to a preset scanning frequency range and a preset frequency interval. A scanning speed sequence is generated according to a preset scanning speed range and a preset speed interval. Frequency scanning and speed scanning are performed according to formula (2), the scanning frequency sequence and the scanning speed frequency, and using VWTM, such that the dispersion graph can be obtained. The dispersion graph can be a frequency velocity dispersion graph, that is, F-C dispersion graph.

Figure 5:
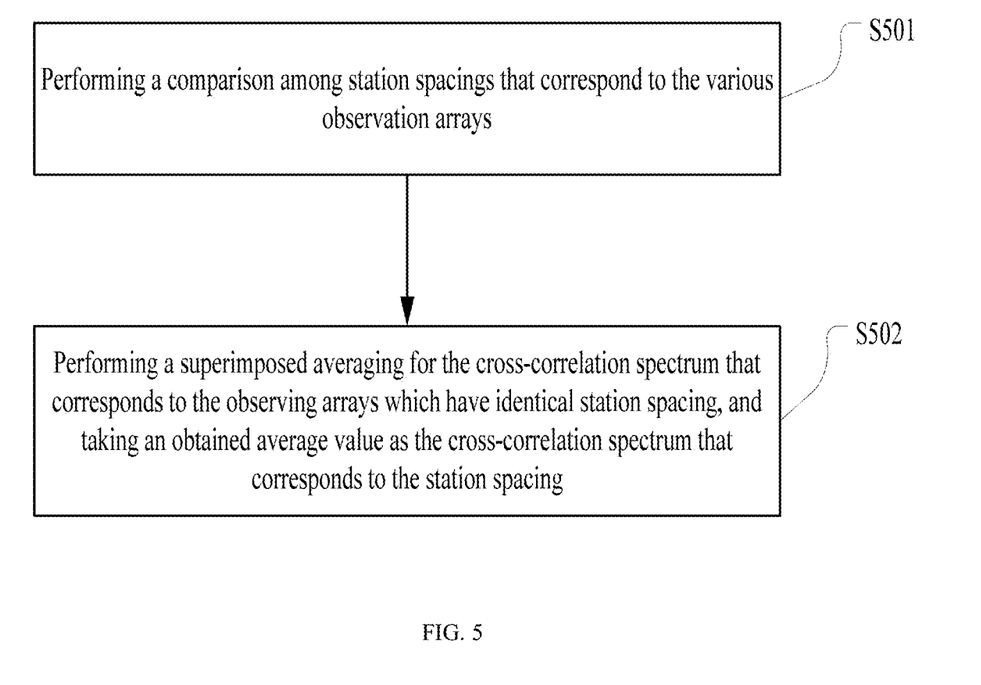
FIG. 5 illustrates an implementation flow chart of averaging cross-correlation spectrum in the surface wave prospecting method provided by the embodiment of the present application.

As one embodiment of the present application, after Step 401 and before Step 402, the method further comprises:

in step S501, performing comparison among the station spacings corresponding to the various observation arrays.

In step 502, performing a superimposed averaging for the cross-correlation spectrum that corresponds to the observation array which have identical station spacing, and taking the obtained average value as the cross-correlation spectrum that corresponds to the station spacing.

In this embodiment, the station spacings which correspond to the various observation arrays are sorted from largest to smallest, cross-correlation spectrums that corresponds to the observation arrays which have the identical station spacing are averaged, and the average value is taken as the cross-correlation spectrum that corresponds to the station spacing; in this way, vibration data of the observation arrays which have the identical station spacing can be fully utilized, such that the calculated cross-correlation spectrum can be more accurate, an effectiveness of the extracted dispersion graph can be increased, and the accuracy of seismic exploration can be improved.

In step 103, establishing an initial stratigraphic model through the dispersion graph.

Currently, in engineering application, dispersion curves can only be connected by transient surface wave prospecting method manually or automatically in frequency-velocity dispersion graph according to the maximum energy, the depth and the thickness of stratum are inverted according to zigzag characteristic in the dispersion curves. Using higher modes surface wave to perform an inversion described above must have an accurate judgment towards the mode of the utilized higher modes surface wave. However, when there exists a low-velocity layer or high-velocity layer in the stratum, not only energy distribution of different modes of Rayleigh wave are changed, but also velocities of different modes are changed with the change of frequency, such that a phenomenon of mode kissing occurs frequently, which, in this way, bring much troubles to the judgment of higher modes of dispersion curves. Moreover, when there exists a weak intercalated layer in the horizontally layered stratigraphic model in a high frequency range, the higher modes of surface wave has greater energy than the fundamental mode, which means, the fundamental mode couldn't be obtained by the current method in certain frequency range, but higher modes can be obtained instead. In actual exploration, a true stratum is not an ideal horizontally layered isotropic structure, so that there is usually not Rayleigh wave for higher modes of dispersion graph waves in high imaging quality, which restricts the inversion with higher modes of dispersion curves.

In order to avoid the problem generated when performing inversion using the aforesaid higher modes of dispersion curves, we find that when there exists a low-velocity or high-velocity intercalated layer in the stratum, Rayleigh wave energy in the frequency range which corresponds to burial depth of the intercalated layer has a step change from the fundamental mode to the first mode or a higher mode, thereby causing a problem that the fundamental mode and the higher modes of surface wave curves are only consecutive in a certain frequency range, there may be a worse imaging quality in actual data. We consider that, energy distribution of each of modes has a close relationship with the stratum structure in the frequency velocity spectrum. Thus, in this embodiment, the frequency range is classified according to energy distribution relationship of the various modes of each of different frequency ranges in the frequency-velocity dispersion graph domain, so that a simple layered stratigraphic model can be established rapidly, and can be taken as the initial model of subsequent accurate inversion.

Figure 6:
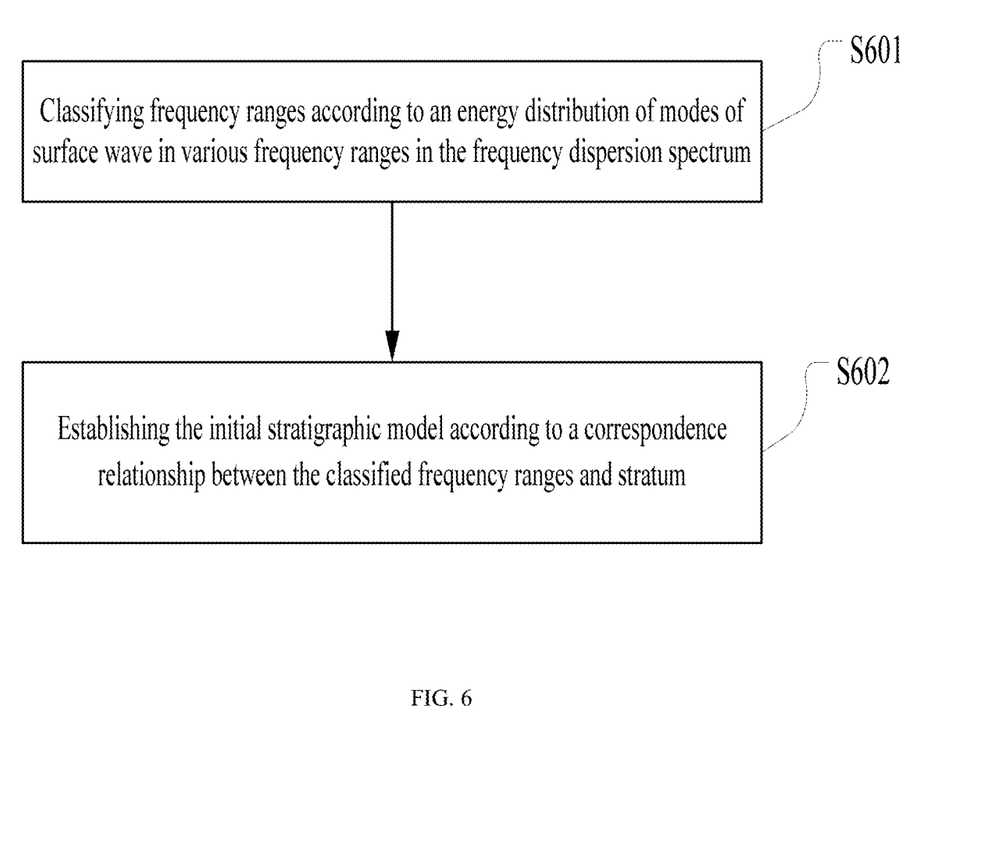
FIG. 6 illustrates an implementation flow chart of establishing an initial stratigraphic model in the surface wave prospecting method provided by the embodiment of the present application.

As one embodiment of the present application, S103 can comprise:

in step S601, classifying the frequency ranges according to energy distribution of modes of surface wave for the various frequency ranges in the dispersion graph.

In step S602, establishing initial stratigraphic model according to a correspondence relationship between the classified frequency ranges and the stratum.

As shown in FIG. 7, FIG. 7a illustrates a F-C domain dispersion graph, dotted lines in this figure are theoretical dispersion curves of rayleigh wave; FIG. 7b illustrates frequency dispersion points extracted according to energy of the dispersion graph, and the frequency ranges are classified into 4 types according to distribution characteristics; FIG. 7c is a theoretical F-C domain dispersion graph obtained by a kernel function of a Green's function.

Figure 8:
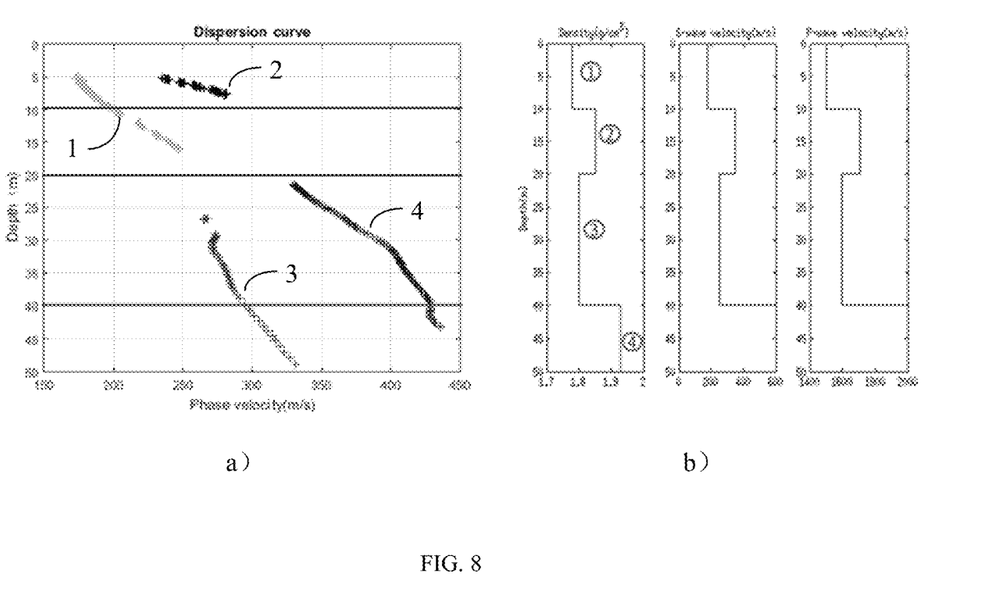
FIG. 8 illustrates a s dispersion graph and stratigraphic model in a depth domain provided by the embodiment of the present application.

Frequency Points along dispersion curves in frequency-velocity domain can be converted into a depth-velocity domain according to a half-wavelength theory, as shown in FIG. 8. FIG. 8a is a stratigraphic model. It can be seen that, points of no. 1 dotted line and no. 3 dotted line on the dispersion graph are the points on the fundamental mode of dispersion curves, points of no. 2 dotted line and no. 4 dotted line are the points on the higher modes of dispersion curves. When the stratigraphic model is compared with the dispersion curves of the obtained depth domain, it can be seen that, the third layer (low-velocity layer) having a burial depth of displacement 20-40 m is substantially corresponding to the distribution of dispersion points of no. 4 in a depth-velocity profile; the first layer for 0-10 mm is substantially corresponding to dispersion points of no. 2 in the depth-velocity profile too. In this way, we can see that there exists one-to-one correspondence relationship between the distribution of higher modes of dispersion curves and the stratum, which proves that an idea of classifying the dispersion points in the frequency domain, delaminating the stratum, and establishing the initial model is correct.

In step S104, performing dispersion curves inversion based on the initial stratigraphic model and inversion algorithm.

In this embodiment, inversion algorithms such as a simulated annealing algorithm and a genetic algorithm can be used to perform dispersion curves inversion so as to obtain stratum information and/or velocity information of vibration waves. For example, stratum depth information and velocity profile can be obtained, such that a prospecting of stratum structure can be implemented.

Surface wave prospecting proposed by the embodiments of the present application has following advantages:

1. the dispersion information of higher modes of surface wave can be extracted from passive source surface wave signals.

2. by using classification method in frequency domain to laminate stratum and establish the initial stratigraphic model, and then performing an inversion for stratum using the inversion algorithm, in this way, computation time of the inversion algorithm can be reduced greatly, and an instability of inversion can also be reduced greatly.

3. when passive source signals are collected, the observation array can be arranged arbitrarily, there is nearly no requirement for the site, collecting time can be between 15 minutes and 30 minutes, a late computation time of a normal notebook computer (which is provided with CPU with the type of core i5, and 8 GB RAM) is about 8 minutes, inversion computation requires less time. Moreover, seismic source is unnecessary, the environment won't be affected, general engineering seismometers (e.g., the transient surface wave seismometer) can be used for sampling data, advantages including high efficiency and economy are integrated together.

The embodiments of the present application use VWTM to obtain the dispersion graph, extract the dispersion curves of surface wave including fundamental mode of surface waves and higher modes of surface waves from the dispersion graph, establish the initial stratigraphic model, perform dispersion curves inversion according to the initial stratigraphic model and the inversion algorithm, thereby implementing an exploration of stratum, dispersion information of higher modes of surface wave can be extracted from the vibration data, the dispersion information of the higher modes of surface wave is added into the inversion operation of stratum, such that non-uniqueness of inversion is reduced; the computation time of the inversion algorithm can be reduced by establishing the initial stratigraphic model, and the instability of the inversion algorithm can also be reduced. The vibration collecting device can be arranged arbitrarily, a requirement of site layout is reduced, and a site adaptability of site of surface wave prospecting is improved.

It should be understood that, the sequence number of each of the steps in the aforesaid embodiments don't mean an order of execution sequence, the execution sequence of each of processes should be determined by functionalities and internal logic thereof, and shouldn't be regarded as any limitation to implementation process of the embodiments of the present application.

Figure 9:
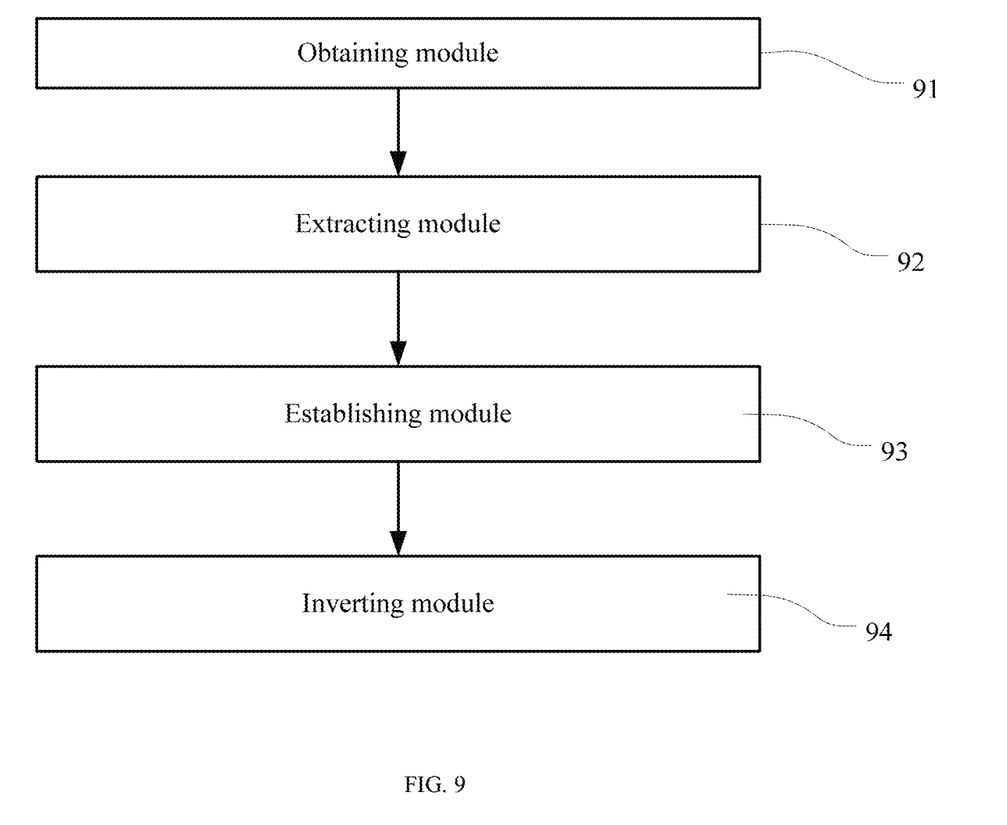
FIG. 9 illustrates a surface wave prospecting instrument provided by the embodiment of the present application.

Corresponding to the surface wave prospecting method described in the aforesaid embodiments, FIG. 9 illustrates a schematic view of a surface wave prospecting instrument provided by one embodiment of the present application. For convenient explanation, the part that is related with this embodiment is described merely.

Please refer to FIG. 9, this device comprises an obtaining module 81, an extracting module 92, an establishing module 93 and an inversion module 94.

The obtaining module 91 is configured to obtain vibration data which is collected by a vibration collecting device.

The extracting module 92 is configured to calculate and obtain dispersion graph based on VWTM (Vector Wavenumber Transform Method) and the vibration data, and extract dispersion curves from the dispersion graph; wherein the dispersion curves include the fundamental modes of dispersion curves of surface wave and higher modes of dispersion curves of surface wave.

The establishing module 93 is configured to establish an initial stratigraphic model according to the dispersion graph.

The inverting module 94 is configured to invert the dispersion curves based on the initial stratigraphic model and an inversion algorithm.

Preferably, the calculation formula of the vector wavenumber transform method is:

$$\int_0^{+\infty} \tilde{C}(r,\omega) J_0(kr) r dr = A \cdot Im\{g(\omega,k)\}$$

wherein, $\tilde{C}(r, \omega)$ is a cross-correlation spectrum, A is a constant, $r=\bar{r}$ is a distance between two observation array, $\omega$ is an angular frequency, $\omega=2\pi f$, f is a frequency, $g(\omega, k)$ is a kernel function of a vertical vector of a Green's function, $k=\bar{k}$ is a wavenumber.

Preferably, a calculation process of the vector wavenumber transform method is described in detail as follows:

establishing an expression of the cross-correlation spectrum:

$$\tilde{C}(r,\omega)=F[u(\vec{x}_1,t)]*F[u(\vec{x}_2,t)]$$

wherein, $u(\vec{x}_1, t)$ and $u(\vec{x}_2, t)$ are ambient seismic data signals received from the two observation array respectively, $F[u(\vec{x}, t)]$ is a Fourier transformation of the ambient seismic data signals;

approximating the cross-correlation spectrum to the Green's function, and performing vector wave number transformation so as to obtain an intermediate calculation formula:

$$\int_0^{+\infty} \tilde{C}(r, \omega) J_0(kr) r dr = A \int_0^{+\infty} \text{Im}\{G(r, \omega)\} J_0(kr) r dr =$$
$$A \int_0^{+\infty} \int_0^{+\infty} \text{Im}\{g(\omega, k')\} J_0(rk') J_0(rk) k' r dk' dr$$

Wherein, $G(\omega, r)$ is defined as a vertical component of a Green's function, $G(\omega, r)=\int_0^{+\infty} g(\omega, k) J_0(kr)\, k dk$, $J_0$ is defined as a first kind Bessel function of zero order;

obtaining the calculation formula of the vector wavenumber transform method according to orthogonality of the intermediate calculation formula and the Bessel function, which is as follows:

$$\int_0^{+\infty} \tilde{C}(r, \omega) J_0(kr) r dr =$$
$$A \int_0^{+\infty} \text{Im}\{g(\omega, k')\} \frac{\delta(k-k')}{\sqrt{kk'}} k' dk' = A \cdot \text{Im}\{g(\omega, k)\}.$$

Preferably, the extracting module 92 is configured to:

group observation array which correspond to any two of the vibration collecting devices into an observation array, calculate and obtain a station spacing that corresponds to the observation array; wherein the station spacing is a distance between two observation array in the observation array;

obtain the cross-correlation spectrum that corresponds to the observation array according to the vibration data; and obtain the dispersion graph according to the station spacing, the cross-correlation spectrum that corresponds to the station spacing, and the vector wavenumber transform method.

Preferably, the extracting module 92 is further configured to:

compare station spacings that correspond to the various observation arrays;

perform a superimposed average for the cross-correlation spectrum that corresponds to the observation arrays which have identical station spacing, and take an obtained average value as the cross-correlation spectrum that corresponds to the station spacing.

Preferably, the establishing module 93 is further configured to:

classify frequency ranges according to the energy distribution of modes of surface wave modes in the various frequency ranges in the dispersion graph; and establish the initial stratigraphic model according to the correspondence relationship between the classified frequency ranges and the stratum.

The embodiments of the present application use the VWTM to obtain the dispersion graph, extract the dispersion curves that include fundamental mode surface waves and higher modes surface waves from the dispersion graph, establish the initial stratigraphic model, performs the dispersion curves inversion according to the initial stratigraphic model and the inversion algorithm, thereby implementing the stratum exploration. Since the dispersion information of higher modes of surface wave can be extracted from the vibration data, the higher modes surface wave frequency dispersion information is added into the inversion operation of stratum, such that the non-uniqueness of inversion is reduced; the computation time of the inversion algorithm can be reduced by establishing the initial stratigraphic model, and the instability of the inversion algorithm can also be reduced. The vibration collecting device can be arranged arbitrarily, the requirement of site layout is reduced, and the adaptability of the site of surface wave prospecting is improved.

Figure 10:
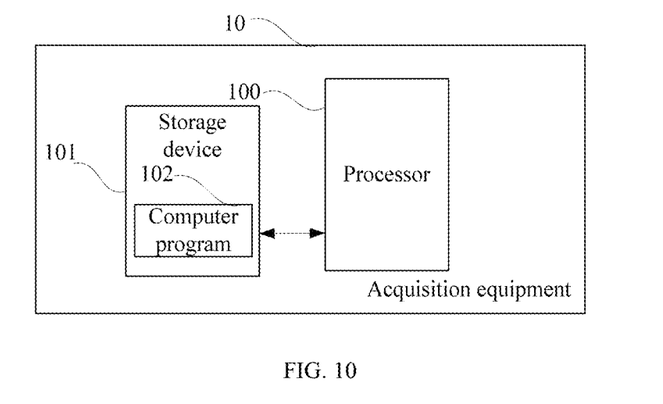
FIG. 10 illustrates a surface wave prospection provided by the embodiment of the present application.

FIG. 10 illustrates a schematic view of an acquisition equipment provided by one embodiment of the present application. As shown in FIG. 10, the acquisition equipment 10 in this embodiment comprises: a processor 100, a storage device 101 and computer program 102 which is stored in the storage device 101 and executable by the processor 100, such as the surface wave prospecting procedures. The processor 100 implements steps in the embodiments of the various surface wave prospecting methods when executing the computer program 102, such as the procedures 101-104 shown in FIG. 1. Alternatively, the processor 100 implements functions of the various modules/units in the various device embodiments described above when executing the computer program 102, such as the functionalities of the modules 91-94 shown in FIG. 9.

Exemplarily, the computer program 102 can be divided into one or a plurality of modules/units, the one or a plurality of modules/units are stored in the storage device 101, and is/are executed by the processor 100 so as to implement the present application. The one or plurality of modules/units can be a set of computer program instruction segments that can accomplish specific functionalities, these instruction segments are used for describing the execution process of the computer program 102 in the surface wave prospection terminal device 10. For example, the computer program 102 can be divided into an obtaining module, an extracting module, an establishing module and an inversion module, functionalities of each of the modules are as follows:

the obtaining module 91 is configured to obtain the vibration data which is collected by a vibration collecting device.

the extracting module 92 is configured to obtain a dispersion graph by applying the vector wavenumber transform method in the vibration data, and extract dispersion curves from the dispersion graph; wherein the dispersion curves includes fundamental mode and higher modes of dispersion curves of surface wave.

the establishing module 93 is configured to establish an initial stratigraphic model according to the dispersion graph.

the inverting module 94 is configured to invert the dispersion curves based on the initial stratigraphic model and an inversion algorithm.

The acquisition equipment 10 can be a computing device such as a desk computer, a notebook computer, a palm and a cloud server. The surface wave prospection terminal device can include but is not limited to, the processor 100, the storage device 101. The one of ordinary skill in the art should understand that, FIG. 10 is merely an example of the acquisition equipment 10, and is not constituted as limitation to the acquisition equipment 10, more or less components shown in FIG. 10 can be included, or some components or different components can be combined; for example, the surface wave prospection terminal device can also include a display device, an input and output device, a network access device, a bus, etc.

The so called processor 100 can be CPU (Central Processing Unit), and can also be other general purpose processors, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional general-purpose processor and so on.

The storage device 101 can be an internal storage unit of the surface wave prospection terminal device 10, such as a hard disk or a memory of the acquisition equipment 10. The storage device 101 can also be an external storage device of the acquisition equipment 10, such as a plug-in hard disk, a SMC (Smart Media Card), a SD (Secure Digital) card, a FC (Flash Card) equipped on the acquisition equipment 10. Further, the storage device 101 may include both the internal storage unit and the external storage device of the acquisition equipment 10, either. The storage device 101 is configured to storing the computer programs, and other procedures and data needed by the acquisition equipment 10. The storage device 101 can also be configured to storing data that has been output or being ready to be output temporarily.

It can be clearly understood by the one of ordinary skill in the art that, for describing conveniently and concisely, dividing of the aforesaid various functional units, functional modules is exemplified merely, in an actual application, the aforesaid functions can be assigned to different functional units and functional modules to be accomplished, that is, an inner structure of the data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can be either realized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, please refer to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiments.

The one of ordinary skill in the art will notice that, the elements and algorithm steps of each of the examples described in connection with the embodiments disclosed herein can be implemented in electronic hardware, or in combination with computer software and electronic hardware. These functions are implemented by hardware or software depends on the specific application and design constraints of the technical solution. The skilled people could use different methods to implement the described functions for each particular application, but such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In other words, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by the computer programs configured to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are only intended to explain but not to limit the technical solutions of the present application. Although the present application has been explained in detail with reference to the above-described embodiments, it should be understood for the one of ordinary skill in the art that, the technical solutions described in each of the above-described embodiments can still be amended, or some technical features in the technical solutions can be replaced equivalently; these amendments or equivalent replacements won't make the essential of corresponding technical solution to be broken away from the spirit and the scope of the technical solution in various embodiments of the present application.

What is claimed is:

1. A surface wave prospecting method
implemented by a surface wave prospecting instrument comprising multiple vibration collecting devices, the method comprising:
in acquisition of a passive source signal, arranging N observation stations at an exploration area and using multiple vibration collecting devices to collect vibration data including ambient noise of the N observation stations,
wherein the vibration data comprises a fundamental mode of a surface wave and higher modes of the surface wave;
in imaging of structures of layers, applying, by at least one computer configured to receive the collected vibration data, a vector wave number transformation method (VWTM) to the ambient noise to obtain a dispersion energy spectrum of the fundamental and higher modes of surface waves, and separating and extracting dispersion curves of both the fundamental and higher modes of surface waves from the dispersion energy spectrum by the at least one computer, wherein the vector wave number transformation method (VWTM) is expressed as:

$$\int_0^{+\infty} \tilde{C}(r,\omega)J_0(kr)rdr = A \cdot Im\{g(\omega,k)\}$$

wherein, $\tilde{C}(r, \omega)$ is a cross-correlation spectrum between two observation stations, A is a constant, r is a distance between the two observation stations, $\omega$ is an angular frequency, $g(\omega, k)$ is a kernel function of a vertical component of a Green's function, k is a wave number, and $J_0$ is the first kind of Bessel function of zero order;
dividing a frequency domain into different clusters according to energy distribution of the fundamental and higher modes of surface waves in the dispersion energy spectrum and establishing an initial stratigraphic model by the at least one computer based on a correspondence relationship between the clusters and the layers;
performing, by the at least one computer, inversion on the dispersion curves of both the fundamental mode and higher modes of surface waves according to the initial stratigraphic model to obtain information on the structures of the layers; and
the at least one computer imaging the structures of the layers according to the information on the structures of the layers and displaying images of the structures of the layers.

2. The surface wave prospecting method according to claim 1, wherein a calculation process of the vector wave number transformation comprises:
establishing an expression of the cross-correlation spectrum by the at least one computer:

$$\tilde{C}(r,\omega) = F[u(\vec{x}_1,t)]^* F[u(\vec{x}_2,t)]$$

wherein, $u(\vec{x}_1, t)$ and $u(\vec{x}_2, t)$ are ambient noise data signals received from two observation stations respectively, $F[u(\vec{x},t)]$ is Fourier transformation of the ambient noise data signals;
approximating the cross-correlation spectrum to the Green's function, and performing a vector wave number transformation by the at least one computer to obtain an intermediate calculation formula, which is expressed as:

$$\int_0^{+\infty} \tilde{C}(r,\omega)J_0(kr)rdr = A\int_0^{+\infty} Im\{G(r,\omega)\}J_0(kr)rdr =$$
$$A\int_0^{+\infty}\int_0^{+\infty} Im\{g(\omega,k')\}J_0(rk')J_0(rk)k'rdk'dr$$

wherein, $G(\omega, r)$ is the vertical component of the Green's function, $G(\omega, r) = \int_0^{+\infty} g(\omega, k)J_0(kr)kdk$, $J_0$ is the first kind of Bessel function of zero order; and
obtaining the calculation formula of the vector wave number transformation by the at least one computer according to orthogonality of the intermediate calculation formula and the Bessel function, which is expressed as:

$$\int_0^{+\infty} \tilde{C}(r,\omega)J_0(kr)rdr =$$
$$A\int_0^{+\infty} Im\{g(\omega,k')\}\frac{\delta(k-k')}{\sqrt{kk'}}k'dk' = A \cdot Im\{g(\omega,k)\}.$$

3. The surface wave prospecting method according to claim 1, wherein said applying, by the at least one computer, a vector wave number transformation to the ambient noise to obtain a dispersion energy spectrum of the fundamental and higher modes of surface waves comprises:
grouping observation stations that corresponds to any two vibration collecting devices into a station pair, calculating and obtaining a distance between every station pair corresponding to the station pair by the at least one computer, wherein the obtained distance is a distance between the two observation stations in the station pair;
calculating the cross-correlation spectrum that corresponds to the station pair according to the vibration; and
calculating, by the at least one computer, a dispersion spectrum of both the fundamental and higher modes of surface waves according to the distance, the cross-correlation spectrum that corresponds to the distance and the vector wave number transformation.

4. The surface wave prospecting method according to claim 3, wherein after calculating and obtaining the distance between every station pair corresponding to the station pair, and before calculating and obtaining the cross-correlation spectrum that corresponds to the station pair according to the vibration data, the method further comprises:
comparing distances for various station pairs, each of the distances for the various station pairs corresponds to a distance between two stations in the corresponding station pair; and
performing a summation and averaging for the cross-correlation spectrum that corresponds to the station pairs, which have an identical distance, and taking the average value acquired from the summation and averaging as the cross-correlation spectrum of the corresponding distances of the station pairs.

5. A surface wave prospecting instrument, comprising:
a surface wave prospecting terminal device and at least one computer operatively coupled to the surface wave prospecting terminal device, the surface wave prospecting terminal device comprising multiple vibration collecting devices, wherein the surface wave prospecting terminal device comprises N observation stations at an exploration area, the multiple vibration collecting devices being configured to collect ambient noise of the N observation stations in acquisition of a passive source signal, wherein the ambient noise comprises a fundamental mode of a surface wave and higher modes of the surface wave;

the at least one computer is configured to:

(a) apply a vector wave number transformation to the ambient noise to obtain a dispersion energy spectrum of the fundamental and higher modes of surface waves; and to separate and extract dispersion curves of both the fundamental and higher modes of surface waves from the dispersion energy spectrum in imaging of structures of layers, wherein the vector wave number transformation is expressed as:

$$\int_0^{+\infty} \tilde{C}(r,\omega) J_0(kr) r dr = A \cdot Im\{g(\omega,k)\}$$

wherein, $\tilde{C}(r, \omega)$ is a cross-correlation spectrum, A is a constant, r is a distance between two observation stations, $\omega$ is an angular frequency, $g(\omega, k)$ is a kernel function of a vertical component of a Green's function, k is a wave number, $J_0$ is a first kind of Bessel function of zero order;

(b) divide frequency domain into different clusters according to energy distribution of the fundamental and higher modes of surface waves in the dispersion energy spectrum, and to establish an initial stratigraphic model based on a correspondence relationship between the clusters and the layers;

(c) perform inversion on the dispersion curves of both the fundamental mode and higher modes of surface waves according to the initial stratigraphic model to obtain information on the structures of the layers; and (d) image structures of the layers according to the information on structures of the layers and display images of the structures of the layers.

6. A non-transitory computer readable storage medium which stores computer program instructions, that, when executed by a processor, causes at least one computer to perform surface wave prospecting operations including acquisition of a passive source signal by arranging N observation stations at an exploration area and collect vibration data including ambient noise of the N observation stations, wherein the vibration data comprises a fundamental mode of a surface wave and higher modes of the surface wave, comprising:

in imaging of structures of layers, applying a vector wave number transformation method (VWTM) to the ambient noise to obtain a dispersion energy spectrum of the fundamental and higher modes of surface waves, separating and extracting dispersion curves of both the fundamental and higher modes of surface waves from the dispersion energy spectrum by the computer, wherein the vector wave number transformation method (VWTM) is expressed as:

$$\int_0^{+\infty} \tilde{C}(r,\omega) J_0(kr) r dr = A \cdot Im\{g(\omega,k)\}$$

wherein, $\tilde{C}(r, \omega)$ is a cross-correlation spectrum between two observation stations, A is a constant, r is a distance between the two observation stations, $\omega$ is an angular frequency, $g(\omega, k)$ is a kernel function of a vertical component of a Green's function, k is a wave number, $J_0$ is the first kind of Bessel function of zero order;

dividing a frequency domain into different clusters according to energy distribution of the fundamental and higher modes of surface waves in the dispersion energy spectrum and establishing an initial stratigraphic model based on a correspondence relationship between the clusters and the layers;

performing inversion on the dispersion curves of both the fundamental mode and higher modes of surface waves according to the initial stratigraphic model to obtain information on the structures of the layers; and imaging the structures of the layers according to the information on the structures of the layers and displaying images of the structures of the layers.

* * * * *